US010671063B2

(12) United States Patent
Poeppel et al.

(10) Patent No.: US 10,671,063 B2
(45) Date of Patent: Jun. 2, 2020

(54) VEHICLE CONTROL DEVICE

(71) Applicant: UATC, LLC, San Francisco, CA (US)

(72) Inventors: Scott C. Poeppel, Pittsburgh, PA (US); Nicholas G. Letwin, Pittsburgh, PA (US); Sean J. Kelly, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 15/378,553

(22) Filed: Dec. 14, 2016

(65) Prior Publication Data

US 2018/0164798 A1  Jun. 14, 2018

(51) Int. Cl.
*G05D 1/00* (2006.01)
*G01S 19/13* (2010.01)
*G05D 1/02* (2020.01)
*G08C 17/02* (2006.01)

(52) U.S. Cl.
CPC ........ *G05D 1/0016* (2013.01); *G05D 1/0038* (2013.01); *G01S 19/13* (2013.01); *G05D 1/0236* (2013.01); *G05D 1/0246* (2013.01); *G05D 1/0257* (2013.01); *G08C 17/02* (2013.01); *G08C 2201/30* (2013.01); *G08C 2201/31* (2013.01)

(58) Field of Classification Search
CPC .................................................... G05D 1/0016
See application file for complete search history.

(56) References Cited

U.S. PATENT DOCUMENTS

| 8,768,539 | B1* | 7/2014 | Clement | ............... | B60W 10/18 |
| | | | | | 701/2 |
| 2005/0213519 | A1* | 9/2005 | Relan | ...................... | G06F 21/43 |
| | | | | | 370/277 |
| 2007/0198145 | A1 | 8/2007 | Norris et al. | | |
| 2014/0303827 | A1 | 10/2014 | Dolgov et al. | | |
| 2015/0134178 | A1 | 5/2015 | Minoiu-Enache | | |
| 2015/0142244 | A1 | 5/2015 | You et al. | | |
| 2015/0226146 | A1* | 8/2015 | Elwart | ................... | B60K 28/04 |
| | | | | | 701/49 |
| 2015/0314780 | A1* | 11/2015 | Stenneth | ............... | B60W 30/00 |
| | | | | | 701/23 |
| 2015/0339928 | A1 | 11/2015 | Ramanujam | | |
| 2015/0348335 | A1* | 12/2015 | Ramanujam | ........... | G07C 5/006 |
| | | | | | 701/23 |
| 2016/0313735 | A1* | 10/2016 | Berkemeier | ......... | G05D 1/0212 |
| 2017/0228126 | A1* | 8/2017 | Kim | ...................... | G02B 6/0055 |

* cited by examiner

*Primary Examiner* — Imran K Mustafa
(74) *Attorney, Agent, or Firm* — Dority & Manning, P.A.

(57) ABSTRACT

Devices, systems, and methods for controlling an autonomous vehicle are provided. In one example embodiment, a control device for user control of an autonomous vehicle includes a communication interface configured to physically couple the control device to an autonomous vehicle to allow communication with the autonomous vehicle. The control device includes an input device configured to receive user input for controlling one or more features of the autonomous vehicle when the communication interface is coupled to the autonomous vehicle. The control device includes one or more computing devices configured to provide one or more control signals to the autonomous vehicle via the communication interface to allow a user to control the autonomous vehicle via the input device. The autonomous vehicle is in a control mode that allows the user to control the autonomous vehicle.

19 Claims, 5 Drawing Sheets

VEHICLE CONTROL DEVICE

FIELD

The present disclosure relates generally to controlling an autonomous vehicle.

BACKGROUND

An autonomous vehicle can perceive its surroundings by using various sensor apparatuses to determine its position on the basis of the information associated with its surroundings. For example, an autonomous vehicle can process captured image data to determine whether there are objects (e.g., pedestrians, structures) in the vehicle's surroundings. This can allow an autonomous vehicle to navigate with minimal or no human intervention and, in some cases, even omit the use of a human driver altogether. However, in some circumstances it may be important to allow a user to control an autonomous vehicle.

SUMMARY

Aspects and advantages of embodiments of the present disclosure will be set forth in part in the following description, or may be learned from the description, or may be learned through practice of the embodiments.

One example aspect of the present disclosure is directed to a control device for user control of an autonomous vehicle. The control device includes a communication interface configured to physically couple the control device to an autonomous vehicle to allow communication with the autonomous vehicle. The control device includes an input device configured to receive user input for controlling one or more features of the autonomous vehicle when the communication interface is coupled to the autonomous vehicle. The control device includes one or more computing devices configured to provide one or more control signals to the autonomous vehicle via the communication interface to allow a user to control the autonomous vehicle via the input device. The autonomous vehicle is in a control mode that allows the user to control the autonomous vehicle.

Another example aspect of the present disclosure is directed to a control device for user control of an autonomous vehicle. The control device includes one or more communication interfaces configured to communicatively couple to an autonomous vehicle. The autonomous vehicle is configured to provide a service of a service provider. The control device includes one or more input devices. The control device includes one or more computing devices comprising one or more processors and one or more memory devices, the one or more memory devices storing instructions that when executed by the one or more processors cause the one or more processors to perform operations. The operations include determining a control access associated with the autonomous vehicle based, at least in part, on a verification of at least one of the control device and a user of the control device. The operations include providing, via one or more of the communication interfaces, one or more first control signals to the autonomous vehicle to cause the autonomous vehicle to enter into a control mode in which the autonomous vehicle is controllable by the user. The operations include receiving data indicative of user input indicating one or more actions to be performed by the autonomous vehicle, the user input being provided via one or more of the input devices. The operations include providing, via one or more of the communication interfaces, one or more second control signals to the autonomous vehicle to cause the autonomous vehicle to perform the one or more actions indicated by the user input.

Yet another example aspect of the present disclosure is directed to a computer-implemented method of controlling an autonomous vehicle. The method includes determining, by one or more computing devices, that a control device is communicatively coupled to an autonomous vehicle. The autonomous vehicle is configured to provide a service of a service provider. The autonomous vehicle is in a first operation state in which the autonomous vehicle does not operate in an autonomous mode. The method includes confirming, by the one or more computing devices, a control access associated with the autonomous vehicle based, at least in part, on a verification of at least one of the control device and a user of the control device. The method includes receiving, by the one or more computing devices, data indicative of user input indicating one or more actions to be performed by the autonomous vehicle, the user input being provided by the user via the control device. The method includes providing, by the one or more computing devices, one or more control signals to the autonomous vehicle to cause the autonomous vehicle to perform the one or more actions indicated by the user input.

Other example aspects of the present disclosure are directed to systems, methods, apparatuses, tangible, non-transitory computer-readable media, user interfaces, memory devices, and vehicles for controlling a vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
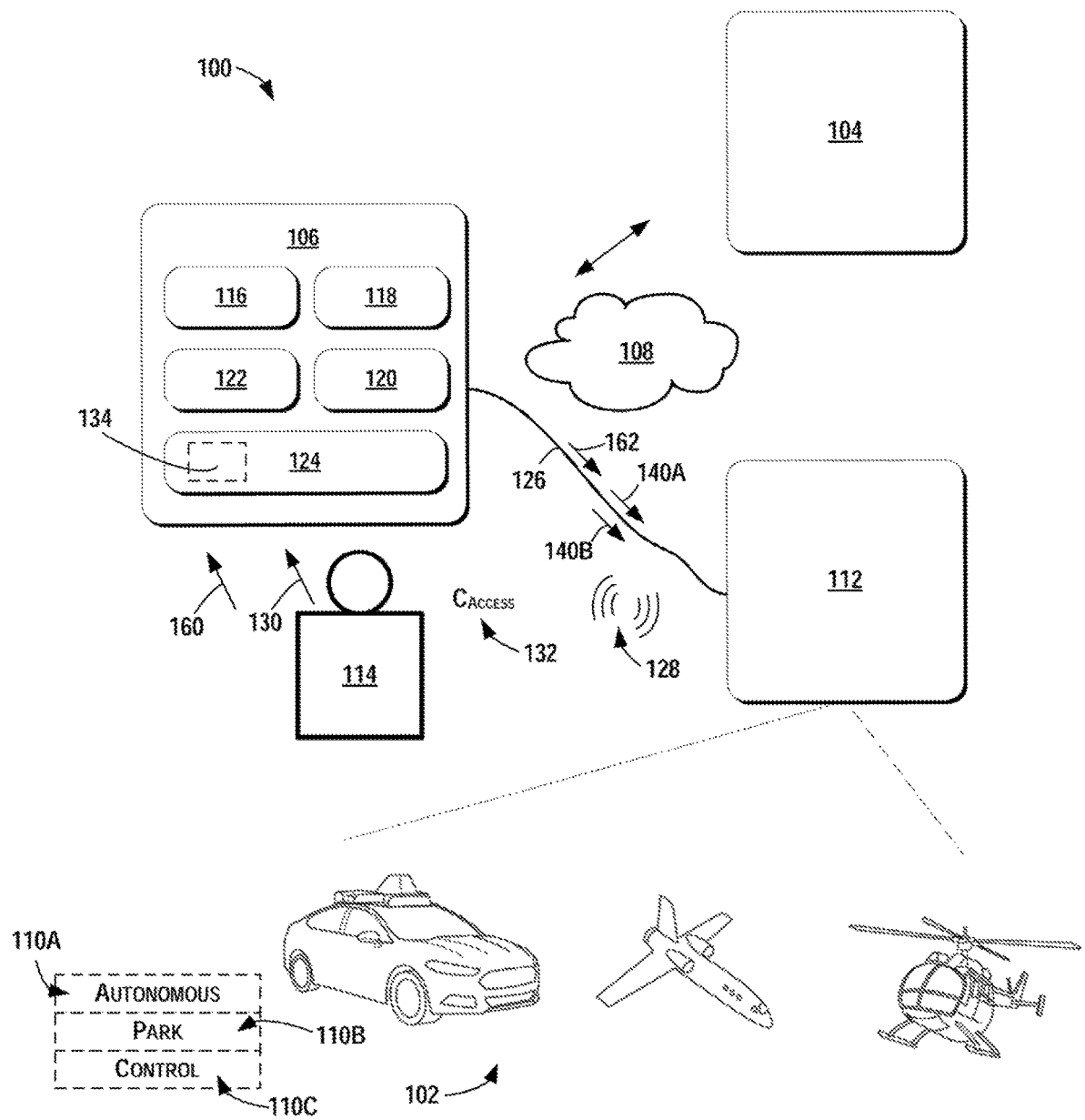
FIG. 1 depicts an example system for user control of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a control device that allows a user to manually control an autonomous vehicle. For instance, a service provider can use a fleet of vehicles to provide a service to a plurality of users. The fleet can include, for example, autonomous vehicles that can drive, navigate, operate, etc. with minimal and/or no interaction from a human driver, as will be further described herein. The service provider can coordinate the autonomous vehicles to provide the services of the service provider (e.g., transportation, courier, delivery). At certain times, the autonomous vehicle may need to be controlled by a user without interference from the vehicle's autonomy system. To do so, the user can utilize a mobile control device of the present disclosure. By way of example, the autonomous vehicle may arrive at a maintenance location (e.g., service depot) for routine maintenance of the vehicle. Upon arrival, the autonomous vehicle can park itself in a waiting area. The control device can communicate with the autonomous vehicle by, for example, a physical connection between the control device and the autonomous vehicle. The user (e.g., an authorized maintenance worker at the service depot) can provide user input to the control device via one or more input device(s) (e.g., joystick, touchscreen). The user input can indicate that the vehicle is to enter into a control mode whereby the vehicle is controllable by the user, rather than autonomously by the vehicle's computing system. Moreover, the user input can indicate that the autonomous vehicle is to move to a location designated for maintenance. The control device can send one or more control signal(s) to the autonomous vehicle directing the vehicle to enter into the control mode and move to the designated location. The autonomous vehicle can receive the control signal(s) and perform these actions accordingly. In this way, the control device can allow a user to locally control an autonomous vehicle without interference from the vehicle's autonomous computing system.

More particularly, an autonomous vehicle (e.g., a ground-based vehicle) can be configured to operate in one or more mode(s). For example, an autonomous vehicle can operate in a fully autonomous (e.g., self-driving) operational mode in which the autonomous vehicle can provide driving and navigational operation with minimal and/or no interaction from a human driver present in the vehicle. The autonomous vehicle can also, or alternatively, operate in a semi-autonomous operational mode in which the vehicle can operate with some interaction from a human driver present in the vehicle. In some implementations, the autonomous vehicle can enter into a park mode between operational modes while the vehicle waits to provide a subsequent service, to receive maintenance, etc. The autonomous vehicle can also enter into a control mode in which the vehicle is controllable by the user and is prohibited from performing an autonomous navigation (e.g., autonomous driving), as further described below.

The control device of the present disclosure can be a mobile device (e.g., handholdable by a user) configured to allow a user to control the autonomous vehicle when, for example, the autonomous vehicle is in the control mode. The control device can include various components to facilitate user control of an autonomous vehicle. For example, the control device can include one or more communication interface(s) configured to communicatively couple the control device to the autonomous vehicle to allow the control device to communicate with the autonomous vehicle. For example, the communication interface(s) can include a physical (e.g., wired) device that can be physically connected to the autonomous vehicle. Additionally, or alternatively, the communication interface(s) can include devices (e.g., transmitters, receivers) that allow the control device to wirelessly communicate with the autonomous vehicle. In some implementations, the control device may only wirelessly communicate with the autonomous vehicle when the control device is within a certain communication range with the vehicle (e.g., within proximity of the vehicle). The control device can include one or more input device(s) (e.g., joystick, touchscreen, microphone) configured to receive user input from a user of the control device. In some implementations, the control device can include a display device (e.g., display screen) configured to display a user interface associated with controlling the autonomous vehicle. In some implementations, the control device can include a position system configured to determine the geographic location of the control device. The control device can also include one or more computing device(s) configured to perform operations to allow the user to control an autonomous vehicle.

For example, the control device can be configured to authenticate the user and/or the control device to confirm that the user and/or control device are permitted control access to the autonomous vehicle. In some implementations, only users that have been granted permission may be allowed to use the control device to manually control (e.g., via user input) the autonomous vehicle. As such, a user may be required to provide log-in information to the control device. The control device can determine whether the user has been granted control access to the autonomous vehicle by confirming the user's log-in credentials. This can be done locally on the control device and/or via communication with one or more remote computing device(s) (e.g., a cloud-based server system of the service provider). In some implementations, control access can be granted to a particular control device, rather than to a particular user. For instance, the control device can be provided with a rotating code, key, etc. that can be used to determine whether the control device is permitted control access to the autonomous vehicle (e.g., to communicate with and/or provide control commands to the vehicle).

Different users and/or control devices can be associated with different levels of access to the autonomous vehicle. A level of access can define one or more condition(s) associated with controlling the autonomous vehicle. The condition(s) can include a speed limitation, a turn angle limitation (e.g., based on the vehicle's speed), a geographic limitation, a limitation on which vehicle features (e.g., components, parts, or the like) are controllable, and/or other types of limitations. By way of example, a geographic limitation can limit user control of the autonomous vehicle to within the boundaries of a maintenance location (e.g., a service depot) and/or within a certain distance from the vehicle's location. While utilizing the control device, the user may only be permitted to cause the autonomous vehicle to move at a low speed (e.g., that is less than five (5) mph), with a limited turn angle so as not to cause sudden and/or potentially damaging movement.

The control device can be configured to cause the autonomous vehicle to enter into the control mode. For instance, the control device can send one or more first control signal(s) to cause the autonomous vehicle to enter into a control mode that allows the user to control the autonomous vehicle (e.g., via the control device). This can occur before, during, and/or after authentication of the user and/or the control device. While in the control mode, the vehicle's computing system can be configured to process signals (e.g., sent from the control device) to perform the actions indicated by the signals. Moreover, the autonomous vehicle can be prohibited from performing an autonomous navigation (e.g., driving navigation) while in the control mode. Accordingly, the autonomous vehicle can be configured to be controlled by the user of the control device, without interference from its autonomy system.

The operating conditions of the autonomous vehicle in the control mode can be different as compared to one or more other mode(s). For instance, one or more of the operation conditions (e.g., top speed, turn angle, rate of acceleration, or the like) of the autonomous vehicle can be limited while the autonomous vehicle is in the control mode as compared to when the vehicle is in an autonomous mode (e.g., fully autonomous mode). By way of example, the autonomous vehicle may be capable of travelling at a top speed of 70 miles per hour (mph) while operating in the autonomous mode. However, the autonomous vehicle may be limited to a top speed of 15 mph while in the control mode (e.g., controllable by a user via the control device). Such limitations can help to avoid a user losing control of (or damaging) the autonomous vehicle while manually controlling the autonomous vehicle.

The control device can be configured to send control signals to the autonomous vehicle in response to receiving user input. For example, the control device can receive user input indicating one or more action(s) to be performed by the autonomous vehicle. The user can provide the user input to the control device via an input device (e.g., joystick, touchscreen). For example, the user input can indicate that the vehicle is to move in a particular direction, move at a particular speed, unlock its doors, shift gears, start its engine, etc. The control device can be configured to receive the user input and provide one or more control signal(s) to the autonomous vehicle via the communication interface(s) to allow a user to control the autonomous vehicle in accordance with the user input. For example, the control signal(s) can cause the autonomous vehicle to perform the action(s) indicated by the user input (e.g., unlock doors, shift gears). In this way, the user can cause the autonomous vehicle to perform the actions necessary for the user to provide maintenance to the vehicle. After the maintenance is complete, the user can release the vehicle from the control mode. To do so, the control device can send one or more second control signal(s) to release the autonomous vehicle from the control mode, allowing the vehicle to operate in an autonomous mode. The autonomous vehicle can, thus, return to providing the services (e.g., transportation services) of the service provider.

The control devices, systems, and methods described herein may provide a number of technical effects and benefits. For instance, the use of a control device that is communicatively coupled to the vehicle, either physically and/or wirelessly within proximity of the vehicle, can cause the user to visualize the vehicle on a firsthand level. This can increase the ability of the user to diagnose and resolve any maintenance issues with the vehicle, while lowering costs (e.g., associated with the data usage on communication networks). Moreover, this can decrease the security vulnerability of the control device and/or the autonomous vehicle. Also, as described above, the control device permits customizable control access to the autonomous vehicle. Accordingly, a larger variety of users can be permitted to use the control device because their respective levels of access can be adjusted to appropriately reflect their training, expertise, location, etc.

The control devices, systems, and methods of the present disclosure may also provide an improvement to vehicle computing technology, such as autonomous vehicle computing technology. For instance, the control device can include a communication interface configured to communicatively couple (e.g., physically) the control device to an autonomous vehicle to allow communication with the autonomous vehicle. The control device can include an input device configured to receive user input for controlling one or more features of the autonomous vehicle when the communication interface is coupled to the autonomous vehicle. The control device can include one or more computing devices configured to provide one or more control signals to the autonomous vehicle via the communication interface to allow a user to control the autonomous vehicle via the input device. By communicatively coupling (e.g., physically, wirelessly) to the autonomous vehicle when within proximity of the vehicle, the control devices, systems, and methods can reduce the potential latency issues that can arise with long distance and/or remote communications. In the implementations in which the control device is physically coupled to the autonomous vehicle, the control devices, systems, and methods can eliminate potential wireless communication latency with the vehicle computing system. Furthermore, the control device can cause the vehicle to enter into a control mode that allows the user to control the autonomous vehicle and/or prohibits autonomous vehicle navigation. Accordingly, the control device, systems, and methods of the present disclosure can improve vehicle computing technology by improving the ability of the vehicle to be controlled by a user without interference from the vehicle's autonomy system, while increasing control security and reducing potential latency issues.

With reference now to the FIGS., example embodiments of the present disclosure will be discussed in further detail. FIG. 1 depicts an example system 100 according to example embodiments of the present disclosure. The system 100 can include a vehicle 102, one or more remote computing device(s) 104, and a control device 106. The remote computing device(s) 104 can be remote from the vehicle 102 and/or the control device 106.

In some implementations, the vehicle 102, remote computing device(s) 104, and/or the control device 106 can communicate via one or more communication network(s) 108. The communication network(s) can include various wired and/or wireless communication mechanisms (e.g., cellular, wireless, satellite, microwave, and radio frequency) and/or any desired network topology (or topologies). For example, the network(s) can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

The vehicle 102 can be a ground-based vehicle (e.g., an automobile), an aircraft, and/or another type of vehicle. The vehicle 102 can be an autonomous vehicle that can drive, navigate, operate, etc. with minimal and/or no interaction from a human driver. The vehicle 102 can be configured to operate in one or more mode(s). For example, the vehicle 102 can operate in a fully autonomous (e.g., self-driving) operational mode 110A in which the autonomous vehicle can provide driving and navigational operation with minimal and/or no interaction from a human driver present in the vehicle 102. The vehicle 102 can also, or alternatively, operate in a semi-autonomous operational mode in which the vehicle 102 can operate with some interaction from a human driver present in the vehicle 102. In some implementations, the vehicle 102 can be configured to enter into a park mode 110B, for example, while the vehicle 102 waits to provide a subsequent service, to receive maintenance, etc.

The vehicle 102 can also be configured to enter a control mode 110C that allows a user to control the vehicle 102. For instance, the vehicle 102 can be configured to receive, process, and respond to control signals from the control device 106 while the vehicle 102 is in the control mode 110C. Moreover, the vehicle 102 can be prohibited from performing an autonomous navigation of the vehicle 102 while the vehicle 102 is in the control mode 110C. For example, the vehicle 102 can be an autonomous ground-based vehicle. The vehicle 102 can be prohibited from performing an autonomous driving navigation while the vehicle 102 is in the control mode 110C. In this way, the vehicle 102 can enter into a control mode 110C in which the vehicle 102 is controllable by a user, without interference from the vehicle's autonomous operation functions.

In some implementations, the operating conditions of the vehicle 102 in the control mode 110C can be different as compared to one or more other mode(s). For instance, one or more of the operation conditions (e.g., top speed, turn angle, rate of acceleration, or the like) of the vehicle 102 can be, at least partially, restricted while the vehicle 102 is in the control mode 110C, as compared to when the vehicle 102 is in an autonomous mode 110A. By way of example, the vehicle 102 can be an autonomous ground-based vehicle (e.g., an automobile). The vehicle 102 may be capable of travelling at a top speed of 70 miles per hour (mph) while operating in the autonomous mode 110A (e.g., driving in a fully autonomous mode). However, the vehicle 102 may be limited to a top speed of 15 mph when the vehicle 102 is in the control mode 110C, and is controllable by a user (e.g., via the control device 106). Such limitations can help to avoid a user losing control of the vehicle 102 while in the control mode 110C.

The vehicle 102 can include a vehicle computing system 112. The vehicle computing system 112 can include various components for performing various operations and functions. For example, the vehicle computing system 112 can include one or more computing device(s) on-board the vehicle 102. The vehicle computing system 112 can include one or more processor(s) and one or more memory device(s), each of which can be on-board the vehicle 102. The one or more memory device(s) can store instructions that when executed by the one or more processor(s) cause the one or more processor(s) to perform the operations and functions of the vehicle 102, as described herein.

The vehicle computing system 112 can include and/or communicate with various other systems associated with the vehicle 102. For instance, the vehicle 102 can include one or more data acquisition system(s), an autonomy system, one or more control system(s), one or more human machine interface system(s), a communications system, and/or other vehicle systems. The other vehicle systems can be configured to control and/or monitor various other features of the vehicle 102. Such other vehicle systems can include, for example, an on-board diagnostics systems, engine control unit, transmission control unit, memory devices, etc.

The systems of the vehicle 102 can be configured to communicate via a network. The network can include one or more data bus(es) (e.g., controller area network (CAN)), an on-board diagnostics connector (e.g., OBD-II), and/or a combination of wired and/or wireless communication links. The systems can send and/or receive data, messages, signals, etc. amongst one another via the network.

The data acquisition system(s) can include various devices configured to acquire data associated with the vehicle 102. This can include data associated with one or more of the vehicle's systems (e.g., health data), the vehicle's interior, the vehicle's exterior, the vehicle's surroundings, the vehicle's users, etc. The data acquisition system(s) can include, for example, one or more image capture device(s). The image capture device(s) can include one or more camera(s), light detection and ranging (or radar) device(s) (LIDAR systems), two-dimensional image capture devices, three-dimensional image capture devices, static image capture devices, dynamic (e.g., rotating, revolving) image capture devices, video capture devices (e.g., video recorders), lane detectors, scanners, optical readers, electric eyes, and/or other suitable types of image capture devices. The image capture device(s) can be located in the interior and/or on the exterior of the vehicle 102. The image capture device(s) can be configured to acquire image data to allow the vehicle 102 to implement one or more machine vision techniques (e.g., to detect objects in the surrounding environment). For example, the image capture device(s) can be used to help detect nearby vehicles, bicycles, pedestrians, buildings, signage, etc. during operation of the vehicle 102.

The data acquisition systems can include one or more sensor(s). The sensor(s) can include motion sensors, pressure sensors, temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data associated with the vehicle 102 and/or relevant to the operation of the vehicle 102 (e.g., in an autonomous mode). The data acquired by the sensor(s) can help detect other vehicles and/or objects, road conditions (e.g., curves, potholes, dips, bumps, changes in grade), measure a distance between the vehicle 102 and other vehicles and/or objects, etc. The sensor(s) can include sensor(s) associated with one or more mechanical and/or electrical components of the vehicle. For example, one or more of the sensor(s) can be configured to detect whether a vehicle door, trunk, gas cap, etc. is in an open or closed position.

The vehicle computing system 112 can also be configured to obtain map data. For instance, a computing device of the vehicle 102 (e.g., within the autonomy system) can be configured to receive map data from one or more remote computing system(s) (e.g., associated with a geographic mapping service provider) and/or local memory device(s). The map data can include two-dimensional and/or three-dimensional geographic map data associated with the area in which the vehicle 102 was, is, and/or will be travelling.

The autonomy system can be configured to allow the vehicle 102 to operate in an autonomous mode (e.g., fully autonomous mode, semi-autonomous mode). For instance, the autonomy system can obtain the data associated with the vehicle 102 (e.g., acquired by the data acquisition system(s)). The autonomy system can also obtain the map data. The autonomy system can control various functions of the vehicle 102 based, at least in part, on the data acquired by the data acquisition system(s) and/or the map data to implement an autonomous mode. For example, the autonomy system can include various models to perceive elements (e.g., road features, signage, objects, people, other animals) based, at least in part, on the acquired data and/or map data. In some implementations, the autonomy system can include machine-learned models that use the data acquired by the data acquisition system(s) and/or the map data to help operate the vehicle 102.

The data acquired by the data acquisition system(s) and/or the map data can be used within the various models to, for example, detect other vehicles and/or objects, detect road conditions (e.g., curves, potholes, dips, bumps, changes in grade), measure a distance between the vehicle 102 and other vehicles and/or objects, etc. The autonomy system can be configured to predict the position and/or movement (or lack thereof) of such elements (e.g., using one or more odometry techniques). The autonomy system can be configured to plan the motion of the vehicle 102 based, at least in part, on such predictions. The autonomy system can include a navigation system and can be configured to implement the planned motion to appropriately navigate the vehicle 102 with minimal and/or no human-driver intervention. For example, the autonomy system can control vehicle speed, acceleration, deceleration, steering, and/or the operation of components to follow the planned motion. In this way, the autonomy system can allow the vehicle 102 to operate in a fully and/or semi-autonomous mode.

The one or more control system(s) of the vehicle 102 can be configured to control one or more features(s) of the vehicle 102. For example, the control system(s) can be configured to control the motion of the vehicle 102 such as, for example, acceleration, speed, steering, braking, turn signals, departure, take-off, lift-off, return (e.g., landing), etc. The control system(s) can be configured to control one or more other feature(s) of the vehicle 102 such as the gears, status of drive, engine, AC system, lights, turn signals, sound system, microphone, etc. In some implementations, the control system(s) can be configured to control one or more access point(s) of the vehicle 102. The access point(s) can include features such as the vehicle's door locks, trunk lock, hood lock, fuel tank access, latches, and/or other mechanical access features that can be adjusted between one or more state(s), position(s), location(s), etc. For example, the control system(s) can be configured to control an access point (e.g., door lock) to adjust the access point between a first state (e.g., lock position) and a second state (e.g., unlocked position). The control system(s) can be configured to adjust these feature(s) between a first state (e.g., off, low) and a second state (e.g., on, high). The control system(s) can also be configured to receive control signals (e.g., from the autonomy system, control device 106) that are indicative of the parameter(s) at which the features and/or access points of the vehicle 102 are to operate.

The communications system of the vehicle computing system 112 can be configured to allow the vehicle systems to communicate with other computing devices. The vehicle computing system 112 can use the communications system to communicate with the remote computing device(s) 104 and/or the control device 106 over the network(s) 108 (e.g., via one or more wireless signal connections). The communications system(s) of the vehicle 102 can also, or alternatively, allow the vehicle 102 to communicate with the control device 106 over a wired connection (e.g., electrical line 126). The communications system can include any suitable components for interfacing with one or more network(s) and/or wired connections, including for example, transmitters, receivers, ports, controllers, antennas, or other suitable components that can help facilitate communication.

The vehicle 102 can be associated with a service provider. For instance, the vehicle 102 can be included in a plurality of vehicles (e.g., a fleet) associated with a service provider. The service provider can coordinate the plurality of vehicles, including the vehicle 102, to provide a service to a plurality of users. As indicated above, the service can be at least one of a transportation service (e.g., a rideshare service), a courier service, a delivery service, and another type of service.

In some implementations, the remote computing device(s) 104 can be associated with the service provider. For example, the remote computing device(s) can be associated with an operations computing system of the service provider that can be used to coordinate, manage, organize, etc. a fleet of vehicles to provide the services of the service provider. The remote computing device(s) 104 can include one or more processor(s) and one or more memory device(s). The one or more memory device(s) can store instructions that when executed by the one or more processor(s) cause the one or more processor(s) to perform operations and functions, such as those for managing a fleet of vehicles to provide services to users.

The control device 106 can be configured to enable user control of a vehicle 102 (e.g., an autonomous vehicle). The control device 106 can be associated with a user 114 that can manually control the vehicle 102 (e.g., via user input) by using the control device 106. The control device 106 can be a computing device that is separate and apart from the vehicle 102 (unless it is coupled to the vehicle 102). For instance, the control device 106 can be a mobile device configured to be handheld by the user 114. The control device 106 can include various components to help allow the user 114 to control the vehicle 102. For instance, the control device 106 can include one or more positioning system(s) 116, one or more output device(s) 118, one or more communication interface(s) 120, one or more input device(s) 122, and one or more computing device(s) 124. The various components of the control device 106 can be configured to communicate with one another via one or more wired and/or wireless network(s).

The one or more positioning system(s) 116 can be configured to determine a geographic location of the control device 106. For instance, the positioning system(s) 116 can include one or more device(s) or circuitry for determining the position of the control device 106. The positioning system(s) 116 can determine actual and/or relative position by using a satellite positioning system (e.g. a GPS system, a Galileo positioning system, the Global Navigation Satellite System (GNSS), the BeiDou Satellite Navigation and Positioning system), an inertial system, a dead reckoning system, based on IP address, by using triangulation and/or proximity to cellular towers or WiFi hotspots, beacons, and the like and/or other suitable techniques for determining position. The positioning system(s) 116 can be configured to provide data indicative of the geographic location of the control device 106 to one or more other component(s) of the control device 106 (e.g., computing device(s) 124).

In some implementations, the control device 106 can include one or more output device(s) 118. The output device(s) 118 can be configured to communicate information to the user 114 (e.g., audibly, visually). For instance, the output device(s) 118 can include speakers, headset, earphones, display screen, CRT, LCD, etc. By way of example, the output device(s) 118 can include a display device that displays a user interface, as further described herein.

The one or more communication interface(s) 120 can be configured to communicatively couple to the vehicle 102. The communication interface(s) 120 can include any suitable components for interfacing with the vehicle 102, including for example, wired connections, transmitters, receivers, ports, controllers, antennas, or other suitable hardware and/or software. The communication interface(s) 120 can be configured to physically couple the control device 106 to a vehicle 102 to allow communication with the vehicle 102. For example, the control device 106 can be permanently or temporarily attached to an electrical line 126 that can be coupled (e.g., temporarily) to the vehicle computing system 112 (e.g., via a port, connector device).

Figure 2:
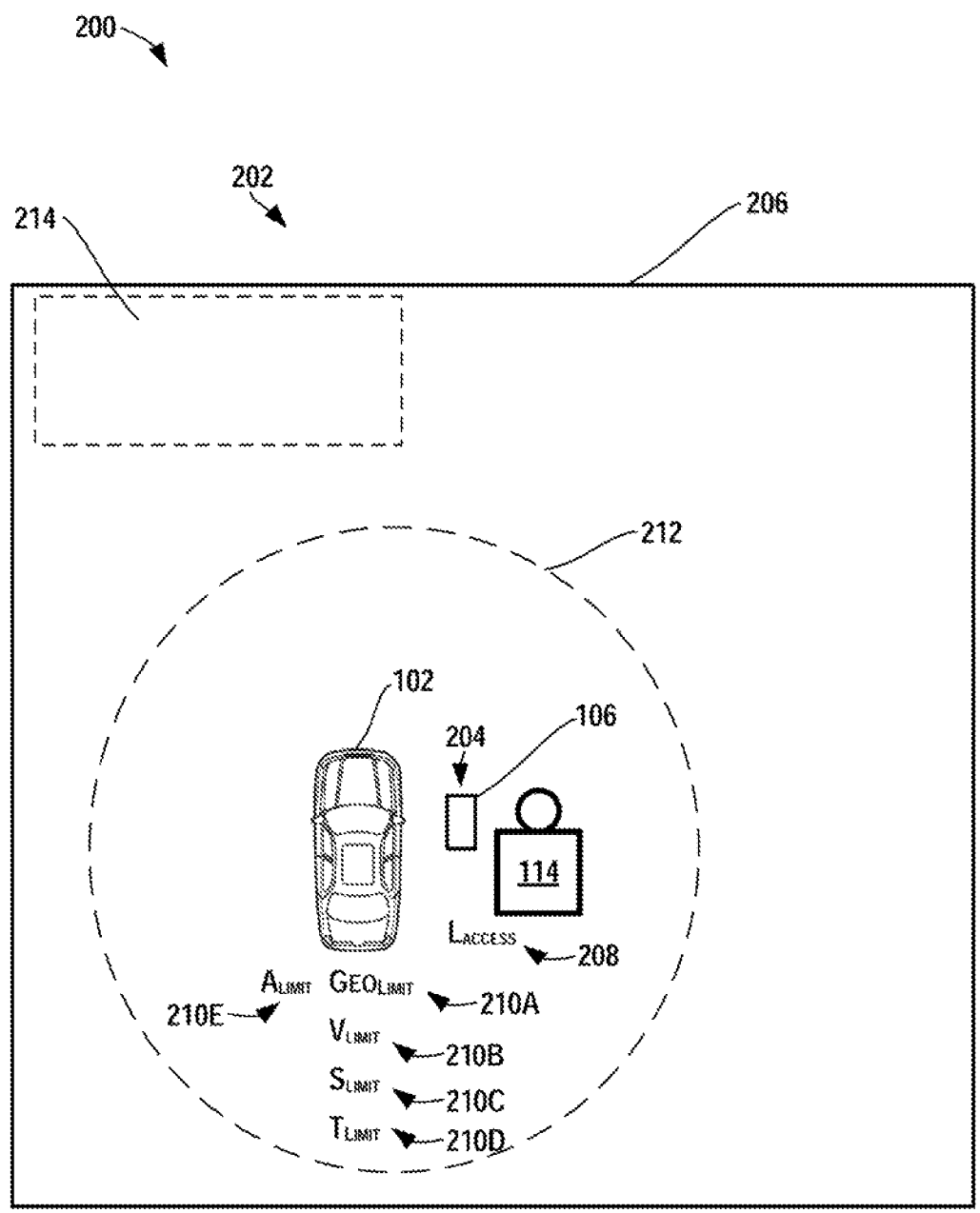
FIG. 2 illustrates a graphical representation of a vehicle within a geographic area according to example embodiments of the present disclosure.

Additionally, or alternatively, the communication interface(s) 120 can be configured to communicatively couple the control device 106 to the vehicle 102 by establishing a wireless connection 128 via one or more wireless communication network(s) (e.g., one or more of the network(s) 108). For instance, the computing device(s) 124 can determine that the control device 106 is within a communication range 212 (e.g., as shown in FIG. 2) of the vehicle 102. The communication range 212 can be, for example, a range in which the control device 106 can, at least, send a signal to the vehicle computing system 112. In some implementations, the communication range 212 can be a range in which the control device 106 and the vehicle computing system 112 can send and/or receive data from one another. For example, the control device 106 and/or the vehicle computing system 112 can send one or more signal(s) (e.g., via Bluetooth protocol, UWB, RF) to determine whether another device is within the communication range 212.

In some implementations, the control device 106 may only wirelessly communicate with the vehicle 102 when the control device 106 is within the communication range 212 of the vehicle 102 (e.g., within proximity of the vehicle). This can help cause the user 114 to view the vehicle 102 firsthand when controlling the vehicle 102.

The one or more input device(s) 122 can be configured to receive user input 130 from user 114 for controlling one or more feature(s) (e.g., components, systems, parts) of the vehicle 102 when the communication interface(s) 120 are coupled to the vehicle 102. The input device(s) 122 can include, for example, hardware for receiving information from a user 114, such as a joystick, gyroscope, touch screen, touch pad, mouse, data entry keys, a microphone suitable for voice recognition, etc. The user 114 can interact with the input device(s) 122 to provide user input 130. For example, the user 114 can manipulate a joystick to provide the user input 130 to the control device 106. Additionally, or alternatively, the user 114 can provide the user input 130 by interacting with one or more element(s) of a user interface displayed on an output device 118 (e.g., display device) of the control device 106.

The one or more computing device(s) 124 can include multiple components for performing various operations and functions. For example, the computing device(s) 124 include one or more processor(s) and one or more memory device(s), each of which can be located within the control device 106. The one or more memory device(s) can store instructions that when executed by the one or more processor(s) cause the one or more processor(s) to perform operations and functions to allow a user to control the vehicle 102.

The computing device(s) 124 can be configured to authenticate that at least one of the user 114 and the control device 106 is permitted control access 132 to the vehicle 102. Control access 132 of a user 114 can include, for example, permission, capability, authority, etc. to access and/or communicate with the vehicle computing system 112 (e.g., via the control device 106) such that it is possible to control the vehicle 102. In some implementations, only users that have been granted permission may be allowed to use the control device 106 to manually control (e.g., via user input 130) the vehicle 102. As such, a user 114 may be required to provide log-in information to the control device 106. The computing device(s) 124 can determine whether the user 114 has been granted control access 132 to the vehicle 102 by confirming the user's log-in credentials (e.g., username, password, or the like). This can be done locally on the control device 106 and/or via communication with the one or more remote computing device(s) 104 (e.g., associated with the service provider). Accordingly, the computing device(s) 124 can be configured to authenticate that the user 114 is permitted to control the vehicle 102.

In some implementations, control access 132 can be granted to the control device 106, rather than to a particular user 114. Control access 132 of a control device 106 can include, for example, permission, capability, authority, etc. to provide one or more control signals to the vehicle 102 (e.g., to control various features of the vehicle 102). For instance, the control device 106 can be provided with a code (e.g., permanent, rotating) that can be used to determine whether the control device 106 is permitted control access to the vehicle 102. In some implementations, a software application 134 can be downloaded to the control device 106 and can be used, at least partially, to authenticate a control device (and/or a user). As such, the computing device(s) 124 can be configured to authenticate that the control device 106 is permitted to provide one or more control signal(s) to the vehicle 102.

Additionally, or alternatively, the computing device(s) 124 can use a geo-authentication process to verify that the control device 106 is permitted control access 132 to the vehicle 102. For instance, FIG. 2 illustrates a graphical representation 200 of the vehicle 102 within a geographic area 202 according to example embodiments of the present disclosure. The geographic area 202 can, for example, be associated with an area designated for vehicle maintenance (e.g., a maintenance location such as a service depot), a certain distance from and/or around the vehicle 102, and/or a distance from a recovery team (e.g., for roadside maintenance). The computing device(s) 124 can determine control access 132 by verifying that the control device 106 is within the geographic area 202.

For instance, the computing devices 124 can determine control access 132 associated with the vehicle 102 based, at least in part, on a geographic location 204 of the control device 106. The computing device(s) 124 can determine the geographic location 204 of the control device 106 by obtaining data via the positioning systems 116. The computing device(s) 124 can also obtain data indicative of one or more area(s) (e.g., the geographic boundaries 206 associated with area 202) in which the control device 106 is permitted control access to the vehicle 102. The computing device(s) 124 can compare the geographic location 204 to the data indicative of the one or more area(s) (e.g., to the geographic boundaries 206). The computing device(s) 124 can determine that the geographic location 204 of the control device 106 is within one or more geographic boundaries 206 (e.g., associated with a maintenance location), based, at least in part, on such a comparison. In some implementations, the computing device(s) 124 can provide data indicative of the geographic location 204 of the control device 106 to one or more remote computing device(s) (e.g., 104) such that the control device 106 can be remotely geo-authenticated.

The computing device(s) 124 can be configured to determine a level of access 208 associated with at least one of the control device 106 and the user 114 of the control device 106. This can occur, for example, after the computing device(s) 124 confirm that the user 114 and/or the control device 106 are permitted control access to the vehicle 102. The level of access 208 can define one or more condition(s) 210A-E associated with controlling the vehicle 102. The vehicle 102 can be controllable by the user 114 based, at least in part, on the one or more condition(s) 210A-E. The condition(s) 210A-E can include a geographic limitation, a limitation on which vehicle features are controllable, a speed limitation, a turn angle limitation (e.g., based on the vehicle's speed), a time limitation, an acceleration limitation, and/or other types of limitations.

For example, the conditions 210A-E can include at least one of a geographic limitation 210A and a vehicle feature limitation 210B. The geographic limitation 210A can include a limitation on a geographic area in which the vehicle 102 is controllable by the user 114 (e.g., via the control device 106). For example, the geographic limitation 210A can limit user control of the vehicle 102 to within the geographic boundaries 206 associated with a maintenance location (e.g., a service depot) and/or within a certain distance from a geographic location of the vehicle 102. The vehicle feature limitation 210B can include a limitation on the features (e.g., parts) of the vehicle 102 that are controllable by the user 114. For example, a particular user (e.g., computer technician) may be permitted to access the vehicle computing system 112 for maintenance, but may be prohibited from accessing the vehicle's engine.

The conditions 210A-E can also, or alternatively, include at least one of a speed limitation 210C, a turn angle limitation 210D, and an acceleration limitation 210E. The speed limitation 210C can be indicative of the speeds (e.g., maximum speed) at which the user 114 and/or the control device 106 is permitted to operate the vehicle 102. The turn angle limitation 210D can indicate the angle at which the user 114 and/or the control device 106 are permitted to cause the vehicle 102 to turn. For example, while utilizing the control device 106, the user 114 may only be permitted to cause the vehicle 102 to move at a low top-end speed (e.g., that is less than fifteen (15) mph), with a limited turn angle so as not to cause sudden and/or potentially damaging movement of the vehicle 102. In some implementations, the turn angle limitation 210D can be based, at least in part, on a speed of the vehicle 102 (e.g., the higher the speed, the lower the permitted turn angle). The acceleration limitation 210E can limit the rate of acceleration at which the user is permitted to cause the vehicle 102 to travel.

Returning to FIG. 1, the one or more computing device(s) 124 can be configured to provide one or more control signal(s) 140A-B to the vehicle 102 via the communication interface(s) 120 to allow a user 114 to control the vehicle 102 via the input device(s) 122. For instance, the control signal(s) 140A-B can include data indicative of instructions that can be processed and implemented by the vehicle 102 (e.g., the vehicle computing system 112). The control signal(s) 140A-B can include a variety of signaling technologies and/or protocols. In some implementations, the signaling technologies and/or protocols can be limited to those for shorter range communications (e.g., via Bluetooth protocol, near-field communication) to help cause the user 114 to be within proximity of the vehicle 102 in order to control the vehicle 102.

The computing device(s) 124 can provide (e.g., via one or more of the communication interface(s) 120) one or more first control signal(s) 140A to the vehicle 102 to cause the vehicle 102 to enter into a control mode 110C in which the vehicle 102 is controllable by the user 114. The first control signal(s) 140A can be sent in response to the control device 106 receiving user input 130 indicating that the vehicle 102 is to enter the control mode 110C. Additionally, or alternatively, the first control signal(s) 140A can be automatically sent by the control device 106 (e.g., without corresponding user input) to the vehicle 102 when, for the example, the control device 106 is physically connected to the vehicle 102, wirelessly connected to the vehicle 102, within a communication range 212, etc.

The computing device(s) 124 can also receive data indicative of user input 130 indicating one or more action(s) to be performed by the vehicle 102. The user 114 can provide the user input 130 via one or more of the input device(s) 122 (e.g., joystick, touchscreen). The user input 130 can be indicative of one or more action(s) to be performed by the vehicle 102. For example, the user input 130 can indicate that the vehicle 102 is to move in a particular direction, move at a particular speed, unlock its doors, shift gears, start its engine, and/or perform any other permitted actions. In this way, the user 114 can provide user input 130 to control the vehicle 102 in a manner that the user desires, for example, to move the vehicle 102 to a particular location (e.g., onto a tow truck), to best provide vehicle maintenance, etc.

The computing device(s) 124 can be configured to provide control signal(s) to the vehicle in response to receiving the user input 130. For example, the computing device(s) 124 can be configured to process data indicative of the user input 130 to generate one or more second control signal(s) 140B that instruct the vehicle 102 to perform the action(s) indicated by the user input 130. The computing device(s) 124 can provide (e.g., via one or more of the communication interface(s) 120), the one or more second control signal(s) 140B to the vehicle 102 to cause the vehicle 102 to perform the one or more action(s) indicated by the user input 130.

The vehicle 102 (e.g., the vehicle computing system 112) can receive the second control signal(s) 140B, process the signal(s), and perform the instructed action(s) accordingly. The action(s) permitted to be performed by the vehicle 102 can be based, at least in part, on the conditions 210A-E associated with the level of access 208 (e.g., of the user 114, of the control device 106). For example, the second control signal(s) 140B can cause the vehicle 102 to unlock its doors, unlock its hood, shift gears, and/or adjust other features of the vehicle 102 (e.g., that the user 114 is permitted to access and/or control). Moreover, the second control signal(s) 140B can cause the vehicle 102 to move. By way of example, the second control signal(s) 140B can cause a movement of the vehicle 102 within at least one of a speed limitation 210C and a turn angle limitation 210D. In this way, the user 114 can cause the vehicle 102 to perform the actions necessary for the user 114 to provide maintenance to the vehicle 102.

Figure 3:
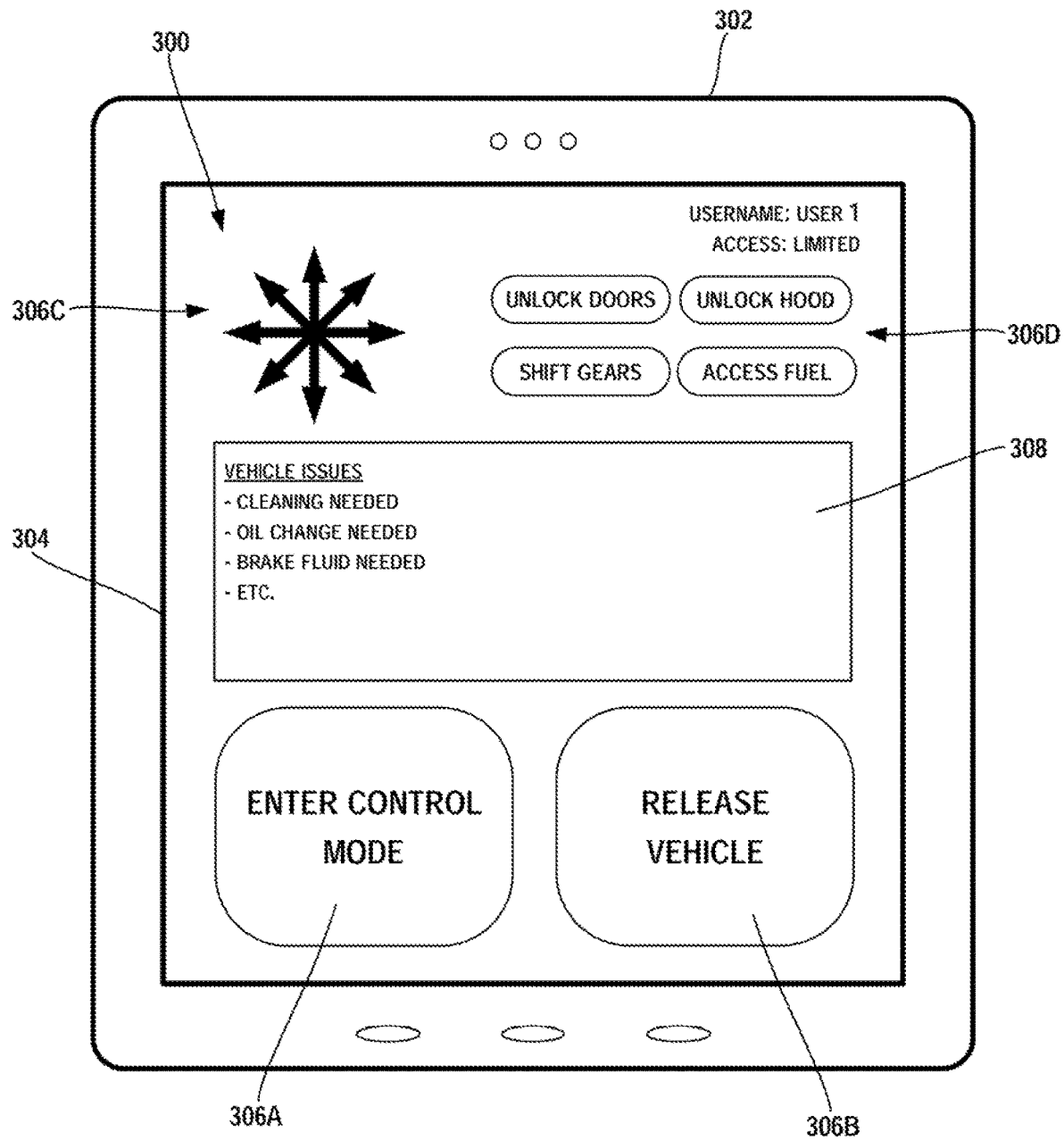
FIG. 3 illustrates a user interface displayed via a display device according to example embodiments of the present disclosure.

In some implementations, the user 114 can provide the user input 130 by interaction with a user interface displayed via the control device 106. FIG. 3 illustrates a user interface 300 displayed via a display device 302 according to example embodiments of the present disclosure. The display device 302 can be included and/or otherwise associated with the output device(s) 118 of the control device 106. The display device 302 can be configured to display the user interface 300. At least one of the input device(s) 122 of the control device 106 can include a touchscreen 304 associated with the display device 302. In some implementations, the user interface 300 can be associated with a software application (e.g., 134) running on the control device 106 (e.g., the computing device(s) 124).

The user 114 can provide user input 130 to the control device 106 via interaction with one or more element(s) of the user interface 300. For example, the user interface 300 can include an element 306A with which a user 114 can interact to indicate that the vehicle 102 is to enter into the control mode 110C. Moreover, the user interface 300 can include an element 306B with which a user 114 can interact to indicate that the vehicle 102 is to be released from the control mode 110C (e.g., to enter into the autonomous mode 110A).

The one or more interface element(s) of the user interface 300 can be generic, while one or more of the interface element(s) can be user and/or device specific. For instance, in some implementations, the elements presented by the user interface 300 can be generic to all users and/or all control devices. By way of example, the user interface 300 can include one or more element(s) 306C with which the user 114 can interact to indicate that the vehicle 102 is to move (e.g., in a certain direction, at a certain speed, or the like). In some implementations, the elements presented by the user interface 300 can be based, at least in part, on the level of access 208 associated with the user 114 and/or the control device 106. The user interface 300 can include one or more element(s) 306D with which the user 114 can interact to cause the vehicle 102 to perform action(s) within the conditions of the permitted level of access 208. For instance, a mechanic may be permitted to unlock the vehicle doors, unlock the vehicle hood, shift vehicle gears, access a fuel compartment, etc. Accordingly, the user interface 300 can display user specific elements (e.g., 306D) reflecting these permitted actions.

In some implementations, the user interface 300 can include one or more element(s) 308 showing one or more issue(s) associated with the vehicle 102. For instance, the element(s) 308 can present information that is descriptive of the features of the vehicle 102 that may need maintenance and/or a diagnosis of vehicle problems. This can occur after the control device 106 is communicatively coupled (e.g., physically, wirelessly) to the vehicle 102. The elements shown in user interface 300 are not intended to be limiting. The user interface 300 can include less, more, and/or different elements than those shown in FIG. 3. Moreover, a person of ordinary skill in the art would understand that those elements described as being generic can, in some implementations, be user and/or device specific, or vice versa.

Returning to FIG. 1, the computing device(s) 124 can be configured to release the vehicle 102 from the control mode 110C. For example, after the maintenance is complete the user 114 can cause the vehicle 102 to move to a release and/or launch point 214 (e.g., as shown in FIG. 2). The user 114 can provide user input 160 (e.g., to element 306B) indicating that the vehicle 102 is to be released from the control mode 110C and/or returned to another operation mode (e.g., autonomous mode 110A). The computing device(s) 124 can receive data indicative of the user input 160. The computing device(s) 124 can provide one or more third control signal(s) 162 to the vehicle 102 to cause the vehicle 102 to exit the control mode 110C. The vehicle 102 can enter into another operational mode, such as the autonomous mode 110A. In this way, the vehicle 102 can be released from the control mode 110C such that it can return to providing the services (e.g., transportation, courier, delivery) of the service provider.

Figure 4:
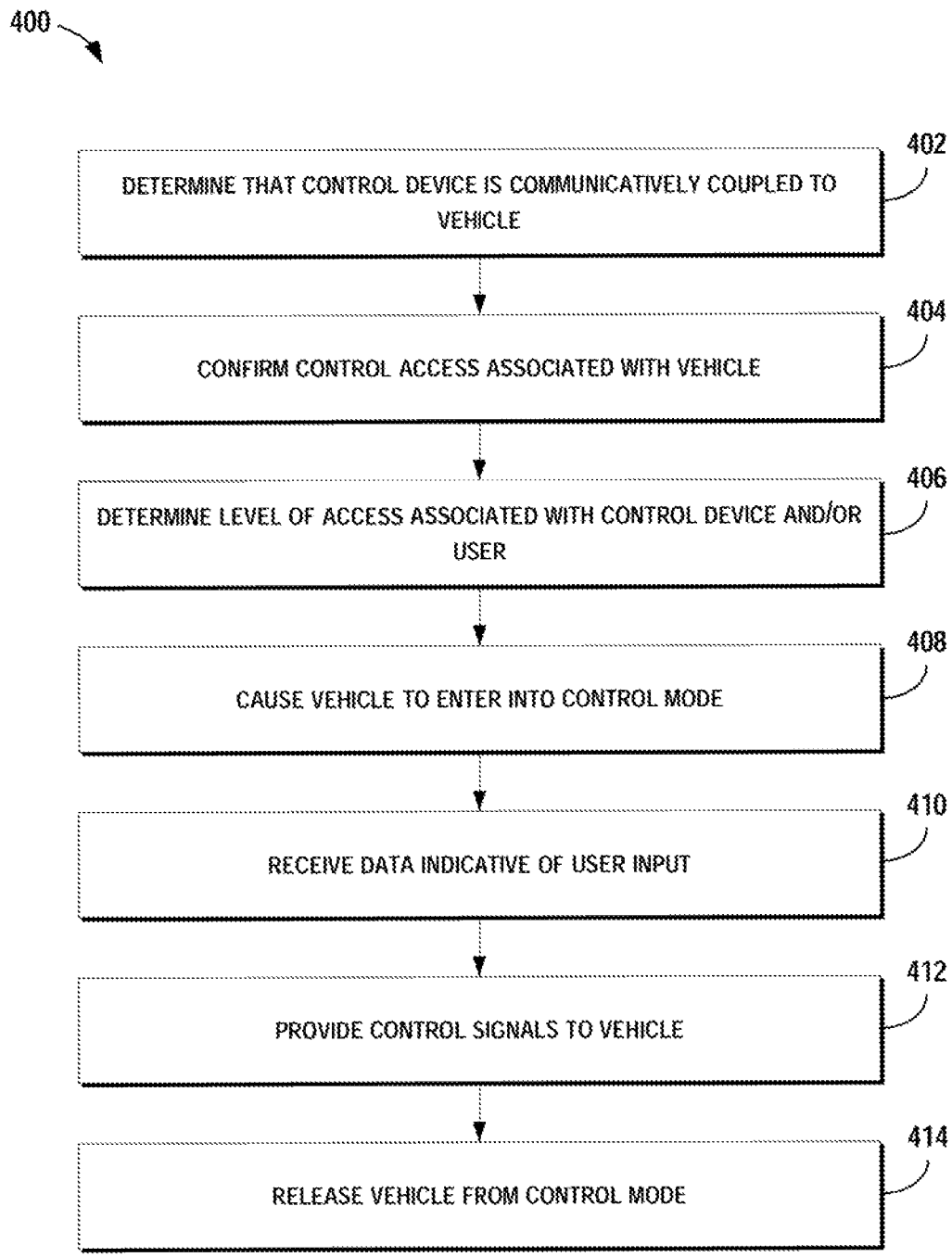
FIG. 4 depicts a flow diagram of an example method of controlling a vehicle according to example embodiments of the present disclosure.

FIG. 4 depicts a flow diagram of an example method 400 of controlling a vehicle (e.g., an autonomous vehicle) according to example embodiments of the present disclosure. One or more portion(s) of method 400 can be implemented by one or more computing device(s) such as, for example, the computing device(s) 124 shown in FIGS. 1 and 5. Moreover, one or more portion(s) of the method 400 can be implemented as an algorithm on the hardware components of the device(s) described herein (e.g., as in FIGS. 1 and 5) to, for example, control a vehicle (e.g., autonomous vehicle). FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, and/or modified in various ways without deviating from the scope of the present disclosure.

At (402), the method 400 can include determining that a control device is communicatively coupled to the vehicle. For instance, the computing device(s) 124 can determine that a control device 106 is communicatively coupled to a vehicle 102. The control device 106 can be communicatively coupled to the vehicle 102 via a physical connection of the control device 106 and the vehicle 102 (e.g., via electrical line 126). Additionally, or alternatively, the control device 106 can be communicatively coupled to the vehicle 102 via a wireless connection 128. As described herein, the vehicle 102 can be an autonomous vehicle and the vehicle 102 can be configured to provide one or more service(s) of a service provider. For example, at least one of the services can be a transportation service. The vehicle 102 can be configured to operate in one or more mode(s) 110A-C. For example, the vehicle 102 can be in a first operation state in which the vehicle 102 does not operate in an autonomous mode 110A. In some implementations, the vehicle 102 can enter into a park mode 110B when it arrives at a maintenance location for maintenance.

At (404), the method 400 can include confirming control access associated with the vehicle. For instance, the computing device(s) 124 can determine and/or confirm a control access 132 associated with the vehicle 102 based, at least in part, on a verification of at least one of the control device 106 and a user 114 of the control device 106. For example, the computing device(s) 124 can verify the log-in credentials of a user 114 to determine whether the user 114 and/or the control device 106 is permitted control access to the vehicle 102. Additionally, or alternatively, the remote computing device(s) 104 can maintain one or more blacklist(s) and/or whitelist(s) that are indicative of the users and/or control devices that are permitted or prohibited control access to the vehicle 102. In some implementations, the computing device(s) 124 can communicate with the remote computing device(s) 104 to verify that the user 114 and/or the control device 106 is permitted control access to the vehicle 102 (e.g., is listed in a whitelist, not listed in a blacklist). In some implementations, the control device 106 can employ one or more encryption techniques, including public and/or private keys.

At (406), the method 400 can include determining a level of access associated with the control device and/or the user. For instance, the computing device(s) 124 can determine a level of access 208 associated with at least one of the control device 106 and the user 114 of the control device 106. The level of access 208 can define one or more condition(s) 210A-E associated with controlling the vehicle 102. The vehicle 102 can be controllable by the user 114 based, at least in part, on the one or more condition(s) 210A-E. For example, the conditions can include at least one of a limitation 210A on a geographic area 202 in which the vehicle 102 is controllable by the user 114 and a limitation 210B on the features of the vehicle 102 that are controllable by the user 114. The limited geographic area can include the geographic boundaries 206 associated with a maintenance location (e.g., a service depot) and/or certain distance from a geographic location of the vehicle 102.

At (408), the method 400 can include causing the vehicle to enter into the control mode. For instance, the computing device(s) 124 can provide, via one or more of the communication interface(s) 120, one or more first control signal(s) 140A to the vehicle 102 to cause the vehicle 102 to enter into a control mode 110C in which the autonomous vehicle is controllable by the user 114. As described herein, the autonomous functions of the vehicle 102 may not operate while the vehicle 102 is in the control mode 110C. For example, the vehicle 102 may not autonomously navigate while in the control mode 110C. Moreover, while in the control mode 110C, the vehicle 102 may be configured to act in response to one or more control signal(s) sent by the control device 106. As indicated herein, the operating conditions of the vehicle 102 in the control mode 110C can be different as compared to one or more other mode(s). For instance, the operating conditions of the vehicle 102 in the control mode 110C can be limited in a manner similar to that described herein for the conditions 210A-E.

At (410), the method 400 can include receiving data indicative of user input. For instance, the computing device(s) 124 can receive data indicative of user input 130 indicating one or more action(s) to be performed by the vehicle 102. As described herein, the user input 130 is provided by the user 114 via the control device 106. The computing device(s) 124 can translate the data indicative of the user input 130 into one or more control signal(s) (e.g., including instructions) that can be sent to the vehicle 102 to cause the vehicle 102 to perform the action(s).

At (412), the method 400 can include providing one or more control signal(s) to the vehicle. The computing device(s) 124 can provide one or more control signal(s) to the vehicle via the communication interface(s) 120 to allow a user 114 to control the vehicle 102 via the input device(s) 122. For example, the computing device(s) 124 can provide one or more control signal(s) (e.g., via the communication interface(s) 120) to the vehicle 102 to cause the vehicle 102 to perform the one or more action(s) indicated by the user input 130. The vehicle 102 can receive the control signal(s) 140B and perform the action(s) accordingly. For example, the vehicle 102 can accelerate to a certain speed and/or steer in a certain direction as instructed by the control signal(s) 140B.

At (414), the method 400 can include releasing the vehicle from the control mode. For instance, the computing device(s) 124 can provide (e.g., via the communication interface(s) 120) one or more control signal(s) 162 to cause the vehicle 102 to enter a second operation state in which the vehicle 102 operates in an autonomous mode 110A. In this way, the user 114 can utilize the control device 106 to release the vehicle 102 from the control mode 110C such that the vehicle 102 can return to providing the service of the service provider.

Figure 5:
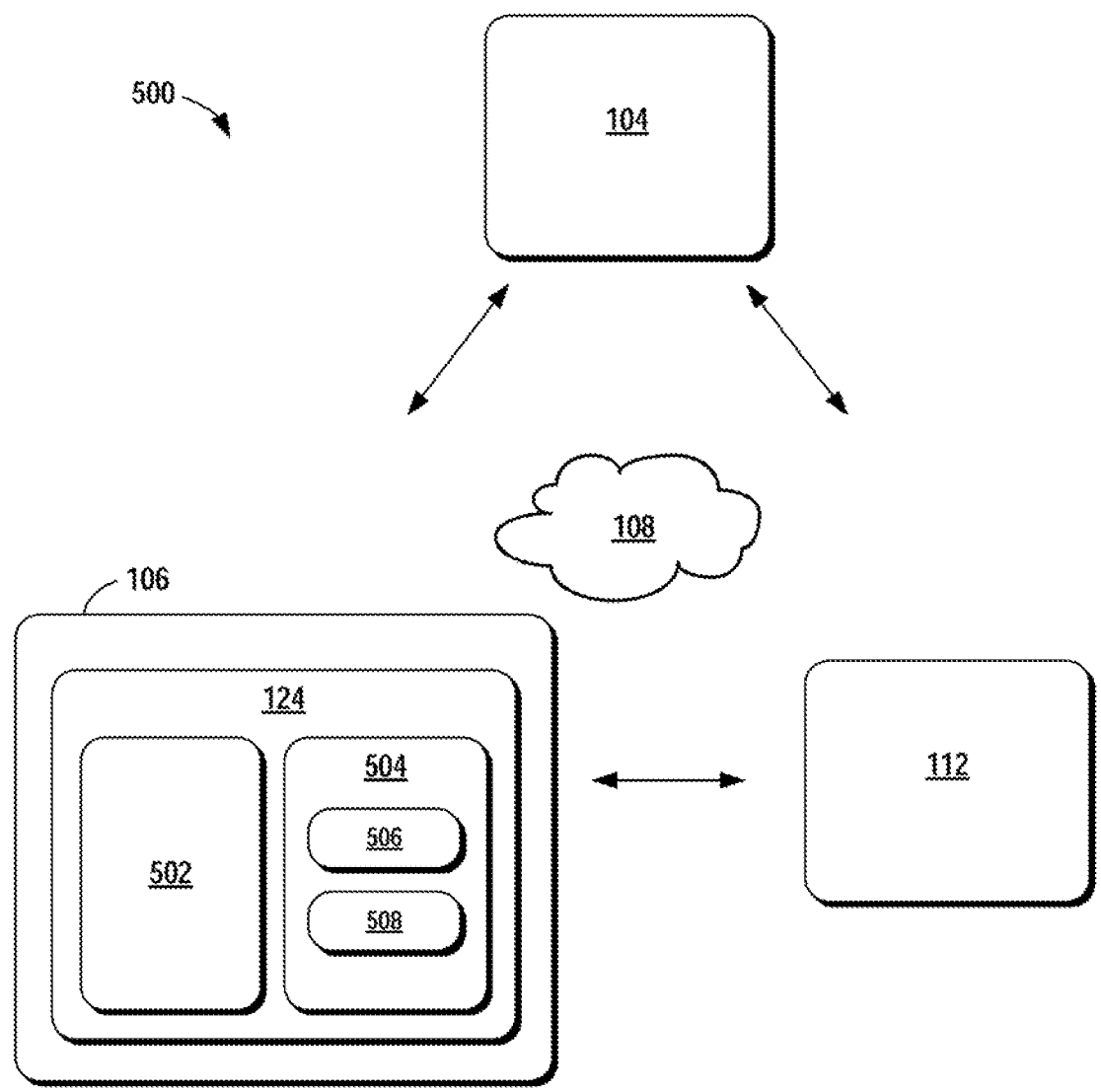
FIG. 5 depicts example system components according to example embodiments of the present disclosure.

FIG. 5 depicts an example system 500 according to example embodiments of the present disclosure. The system 500 can include the remote computing device(s) 104 (e.g., of an operations computing system of a service provider), the control device 106, and the vehicle computing system 112. The remote computing device(s) 104, the control device 106, and the vehicle computing system 112 can be configured to communicate via the one or more network(s) 108.

The control device 106 can include one or more computing device(s) 124. The computing device(s) 124 can include one or more processor(s) 502. The one or more processor(s) 502 can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), processing units performing other specialized calculations, etc. The processor(s) 502 can be a single processor or a plurality of processors that are operatively and/or selectively connected.

The computing device(s) 124 can also include one or more memory device(s) 504. The memory device(s) 504 can include one or more non-transitory computer-readable storage media, such as RAM, ROM, EEPROM, EPROM, flash memory devices, magnetic disks, etc., and/or combinations thereof. The memory device(s) 504 can store information that can be accessed by the one or more processor(s) 502. For instance, the memory device(s) 504 can include computer-readable instructions 506 that can be executed by the one or more processor(s) 502. The instructions 506 can be software written in any suitable programming language or can be implemented in hardware. Additionally, and/or alternatively, the instructions 506 can be executed in logically and/or virtually separate threads on processor(s) 502. The instructions 506 can be any set of instructions that when executed by the one or more processor(s) 502 cause the one or more processor(s) 502 to perform operations.

For example, the memory device(s) 504 can store instructions that when executed by the one or more processor(s) 502 cause the one or more processor(s) 502 to perform operations such as the operations for controlling a vehicle (e.g., one or more portion(s) of method 400), any of the operations and functions of the computing device(s) 124 and/or for which the computing device(s) 124 are configured, and/or any other operations or functions for controlling a vehicle, as described herein.

The one or more memory device(s) 504 can store data 508 that can be retrieved, manipulated, created, and/or stored by the one or more processor(s) 502. The data 508 can include, for instance, data associated with a vehicle 102 (e.g., geographic location), data associated with conditions 210A-E, data associated with a user 114 (e.g., profile, account, history), data associated with authentication of a user 114 and/or a control device 106, data associated with user input 130, data associated with one or more action(s) to be performed by the vehicle, data associated with control signals, and/or other data or information. The data 508 can be stored in one or more database(s). The one or more database(s) can be split up so that they are located in multiple locales.

The network(s) 108 can be any type of communications network, such as a local area network (e.g. intranet), wide area network (e.g. Internet), cellular network, any of the networks described herein, and/or or some combination thereof. The network(s) 108 can also include a direct connection between one or more components of the system 500. In general, communication between one or more component(s) of the system 500 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to computers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein can be implemented using a single computer or multiple computers working in combination. Databases and applications can be implemented on a single system or distributed across multiple systems. Distributed components can operate sequentially or in parallel.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A control device for user control of an autonomous vehicle, comprising:
    a communication interface configured to physically couple to the autonomous vehicle to allow communication with the autonomous vehicle;
    an input device configured to receive user input for controlling one or more features of the autonomous vehicle while the communication interface is coupled to the autonomous vehicle; and
    one or more computing devices configured to
        provide, via the communication interface, one or more first control signals, generated in response to a first user input, to cause the autonomous vehicle to change from an operational mode, in which the autonomous vehicle is configured to perform an autonomous navigation, to a user control mode, in which the autonomous vehicle is prohibited from performing the autonomous navigation, wherein the user control mode allows a user to issue one or more control signals from a set of second control signals that are associated with a specific geographic area; and
        provide, via the communicate interface, one or more second control signals from the set of second control signals to cause the autonomous vehicle to perform one or more actions indicated by a second user input: wherein the one or more actions are limited such that the autonomous vehicle remains within the specific geographic area while in user control mode.

2. The control device of claim I, wherein the autonomous vehicle is an autonomous ground-based vehicle.

3. The control device of claim 1, wherein the one or more computing devices are further configured to authenticate the control device with respect to the autonomous vehicle.

4. The control device of claim 1, wherein the one or more computing devices are further configured to authenticate that the user is permitted to control the autonomous vehicle.

5. The control device of claim 1, wherein the autonomous vehicle is configured to provide one or more services of a service provider, and wherein at least one of the one or more services is a transportation service.

6. The control device of claim 1, wherein the one or more second control signals are to cause a movement of the autonomous vehicle within at least one of a speed limitation, a turn angle limitation, and an acceleration limitation.

7. The control device of claim 6, wherein the turn angle limitation is based, at least in part, on a speed of the autonomous vehicle.

8. A control device for user control of an autonomous vehicle, comprising:
    one or more communication interfaces configured to communicatively couple to the autonomous vehicle;
    one or more input devices; and
    one or more computing devices comprising one or more processors and one or more memory devices, the one or more memory devices storing instructions that when executed by the one or more processors cause the one or more processors to perform operations, the operations comprising:
        determining a control access associated with the autonomous vehicle based, at least in part, on a verification of at least one of the control device or a user of the control device;
        providing, via one or more of the communication interfaces, one or more first control signals, in response to a first user input, to the autonomous vehicle to cause the autonomous vehicle to change from an operational mode, in which the autonomous vehicle is configured to perform an autonomous navigation, to a user control mode in which the autonomous vehicle is prohibited from performing the autonomous navigation wherein the user control mode allows a user to issue one or more control signals from a set of second control signals that are associated with a specific geographic area;
        receiving, via one or more of the communication interfaces, data indicative of a second user input indicating one or more actions associated with one or more second control signals from the set of second control signals to be performed by the autonomous vehicle, the second user input being provided via one or more of the input devices; wherein the one or more actions are limited such that the autonomous vehicle remains within the specific geographic area while in user control mode; and
        providing, via one or more of the communication interfaces, the one or more second control signals to the autonomous vehicle to cause the autonomous vehicle to perform the one or more actions indicated by the second user input.

9. The control device of claim 8, wherein the operations further comprise:
    determining a level of access associated with at least one of the control device or the user of the control device, wherein the level of access defines one or more conditions associated with controlling the autonomous vehicle, and wherein the autonomous vehicle is controllable by the user based, at least in part, on the one or more conditions.

10. The control device of claim 9, wherein the conditions comprise a limitation on the features of the autonomous vehicle that are controllable by the user.

11. The control device of claim 8, wherein the operations further comprise:
    determining that the control device is within a communication range with the autonomous vehicle.

12. The control device of claim 8, further comprising:
    one or more positioning systems configured to determine a geographic location of the control device, and wherein the operations further comprise determining control access associated with the autonomous vehicle based, at least in part, on the geographic location of the control device.

13. The control device of claim 12, wherein determining control access associated with the autonomous vehicle based, at least in part, on the geographic location of the control device comprises:
  determining that the geographic location of the control device is within one or more geographic boundaries associated with a maintenance location.

14. The control device of claim 8, further comprising:
  a display device configured to display a user interface, wherein at least one of the input devices is a touch-screen associated with the display device.

15. The control device of claim 14, wherein the user interface is associated with a software application running on the control device.

16. A computer-implemented method of controlling an autonomous vehicle, the method comprising:
  determining, by a computing system comprising one or more computing devices, that a control device is communicatively coupled to the autonomous vehicle, wherein the autonomous vehicle is in an operational mode in which the autonomous vehicle is configured to perform an autonomous navigation;
  providing, by the computing system, one or more first control signals to the autonomous vehicle, in response to a first user input, to cause the autonomous vehicle to change from an operational mode to a user control mode in which the autonomous vehicle is prohibited from performing the autonomous navigation, wherein the user control mode allows a user to issues one or more control signals from a second control signals that are associated with a specific geographic area
  confirming, by the computing system, a control access associated with the autonomous vehicle based, at least in part, on a verification of at least one of the control device and a user of the control device;
  receiving, by the computing system, data indicative of a second user input indicating one or more actions to be performed by the autonomous vehicle, the second user input being provided by the user via the control device and wherein the one or more actions are limited such that the autonomous vehicle remains within the specific geographic area while in user control mode; and
  providing, by the computing system, one or more control signals to the autonomous vehicle to cause the autonomous vehicle to perform the one or more actions indicated by the user input while the autonomous vehicle is in the user control mode.

17. The computer-implemented method of claim 16, wherein the control device is communicatively coupled to the autonomous vehicle via a physical connection of the control device and the autonomous vehicle.

18. The computer-implemented method of claim 16, further comprising:
  providing, by the one or more computing devices, one or more control signals to cause the autonomous vehicle to re-enter the operational mode in which the autonomous vehicle is configured to perform the autonomous navigation.

19. The computer-implemented method of claim 16, wherein the control device is a mobile device configured to be handheld by the user.

* * * * *